United States Patent [19]
Li

[11] Patent Number: 6,026,585
[45] Date of Patent: Feb. 22, 2000

[54] STRUCTURE FOR A TAPE MEASURE

[76] Inventor: Shih Lin Li, No. 22, Lane 81, Sec. 2, Tunha S. Rd., Taipei, Taiwan

[21] Appl. No.: 08/963,030

[22] Filed: Nov. 3, 1997

[51] Int. Cl.[7] .................................................. G01B 3/10
[52] U.S. Cl. ............................ 33/767; 33/755; 242/381.3
[58] Field of Search ............................ 33/755, 759, 760, 33/761, 767, 768, 769, 770; 242/381, 381.1, 381.2, 381.3, 381.6, 382, 384.7, 385, 385.1, 396, 396.1, 396.5, 410

[56] References Cited

U.S. PATENT DOCUMENTS

| | | | |
|---|---|---|---|
| 2,055,281 | 9/1936 | Dulczewski | 33/767 |
| 3,041,004 | 6/1962 | Busch | 33/767 |
| 4,131,244 | 12/1978 | Quenot | 33/767 |
| 4,153,996 | 5/1979 | Rutty | 242/381.3 |
| 4,205,448 | 6/1980 | Asai | 33/767 |
| 4,903,912 | 2/1990 | Coughlin | 33/767 |
| 4,998,356 | 3/1991 | Chapin | 33/767 |
| 5,007,178 | 4/1991 | Dewire et al. | 33/767 |
| 5,210,956 | 5/1993 | Knispel et al. | 33/767 |
| 5,379,523 | 1/1995 | Wingert | 33/767 |
| 5,395,069 | 3/1995 | Chen | 33/767 |

FOREIGN PATENT DOCUMENTS

| | | | |
|---|---|---|---|
| 55-106301 | 8/1990 | Japan | 33/761 |

*Primary Examiner*—Diego Gutierrez
*Assistant Examiner*—Andrew Hirshfeld
*Attorney, Agent, or Firm*—Raymond Y. Chan; David and Raymond

[57] ABSTRACT

An improved structure for a tape measure includes a measuring tape, a tape measure framework, and a control apparatus, wherein the control apparatus includes a release key and a stopper. The withdrawal motion of the measuring tape can be performed by simply pressing the release key of the control apparatus with one of the user's fringer. Namely, when measuring length of an object, the user may pull out the measuring tape to a length slightly longer than the estimated value, and does not have to worry about the tape suddenly withdrawing automatically. When the tape is to be withdrawn, the user may presses lightly the release key of the control apparatus. The withdrawal of the tape may be halted by releasing the release key to actuate control function of the control apparatus.

3 Claims, 9 Drawing Sheets

STRUCTURE FOR A TAPE MEASURE

BACKGROUND OF THE INVENTION

1. Field of the Invention

The present invention relates to an improved structure for a tape measure, and more particularly to a tape measure equipped with a control apparatus which can control the extended tape to halt at any position during its withdrawal motion.

2. Description of the Prior Art

A tape measure is popularly used in domestic and engineering application, especially for civil and architectural engineering. Since it is so widely used for surveying, measurement, estimation and inspection, it is very important to develop a tape measure which can be handled simply, securely and conveniently.

The common disadvantages of a conventional tape measure usually experienced by the user are:

1. The extended tape with resiliency is apt to bounce back abruptly with a large spring restoring force if it is failed to be fixed at once. It often leads to a result of hurting the user or a third person staying nearby.
2. The control apparatus for extension and withdrawal motion of a conventional tape measure has a high failure rate because of its poor durability with disturbance to the user.
3. Because of the weakpoint described in above item 1, a conventional tape measure is difficult to operate conveniently for measuring several objects with different lengths successively. Once it fails to be halted at a predetermined position, the tape must be drawn out again that results in very low efficiency of measuring.
4. The rapid withdrawing motion of the tape with strong spring restoring force may easily hurt the operator's finger by scraping his finger with the tape edge.

Presently, there were two patents U.S. Pat. No. 4,153,996 and 5,007,178, related to improved structure for tape measures. Although, a great deal of improvements were made to the structure and properties of the conventional tape measure, there are still more improvements that can be made for assembly, and operation.

SUMMARY OF THE INVENTION

It is an object of the present invention to provide an improved structure for a tape measure which can be surely handled.

To achieve this object, according to the present invention, stopping means is provided to halt moving of the tape when it is extended to a certain estimated length slightly longer than that to be measured. The user is free from the fear of being hurt by sudden withdrawal of the tape by spring force.

It is another object of the present invention to provide an improved structure for a tape measure which can be conveniently halted at the exactly desired position for measurement.

To achieve this object, according to the present invention, a control apparatus is provided for the user to press its button with a finger for withdrawing the tape and to halt it at a desired position if the user's finger is released from the key button. Moreover, in the present invention, any one of the user's thumb, middle finger and index finger can be used to operate the key button of the control apparatus. However the two above mentioned inventions, U.S. Pat. No. 4,153,996 and U.S. Pat. No. 5,007,178, only the little finger can be used to exert the controlling force for operation.

It is one more object of the present invention to provide an improved structure for a tape measure wherein only one side of the outer case of the tape measure is needed to be detached for adjustment and re-assembling. However, in the above two inventions, both sides of outer case of the tape measure have to be detached simultaneously in case it is required to re-adjust or re-assemble the tape measure. Apparently, the structure according to the present invention is simpler but more durable with longer life time and less failure rate compared to that according to the above two prior inventions.

BRIEF DESCRIPTION OF THE DRAWINGS

The invention, as well as its many advantages, may be further understood by the following detailed description and drawings in which.

NUMERAL SYMBOLS ILLUSTRATION

Figure 1:
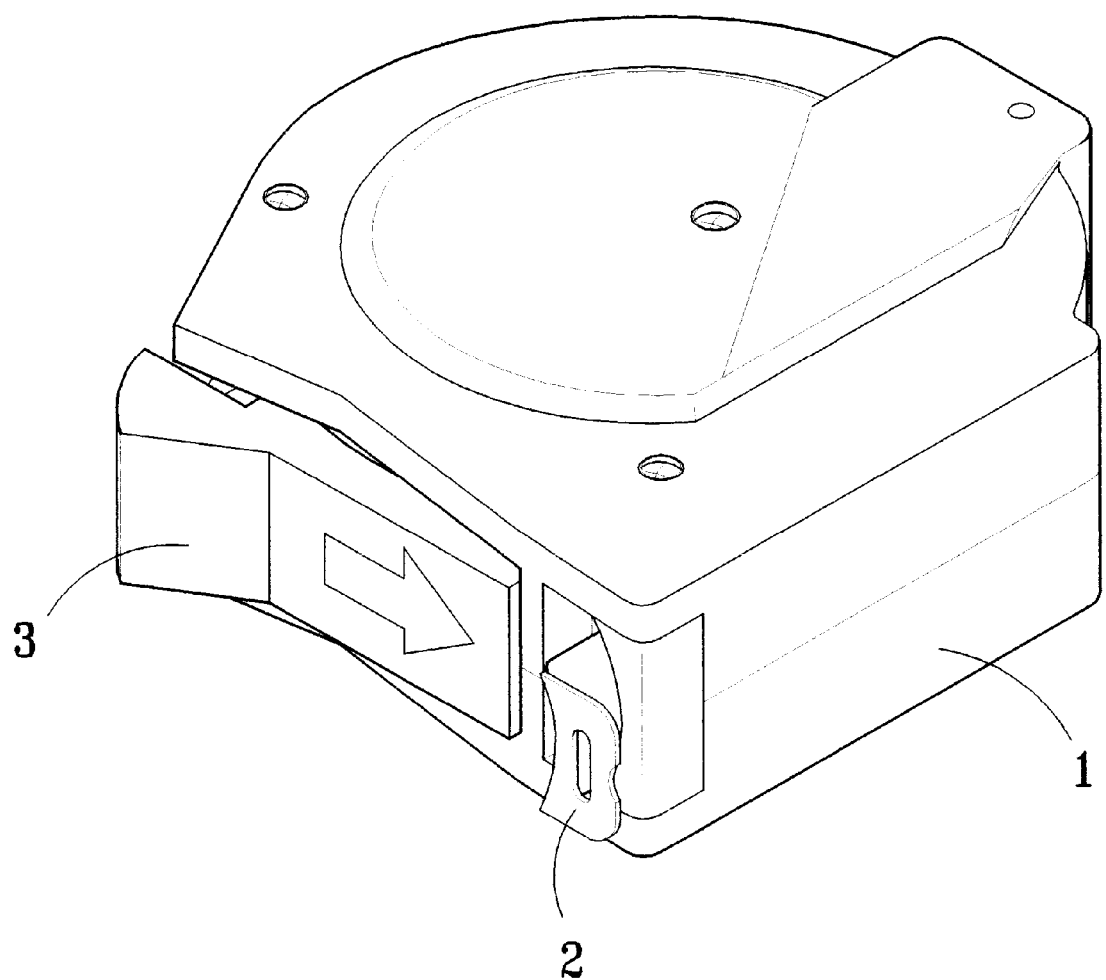
FIG. 1 is a perspective view of the tape measure according to a first embodiment of the present invention.
Figure 2:
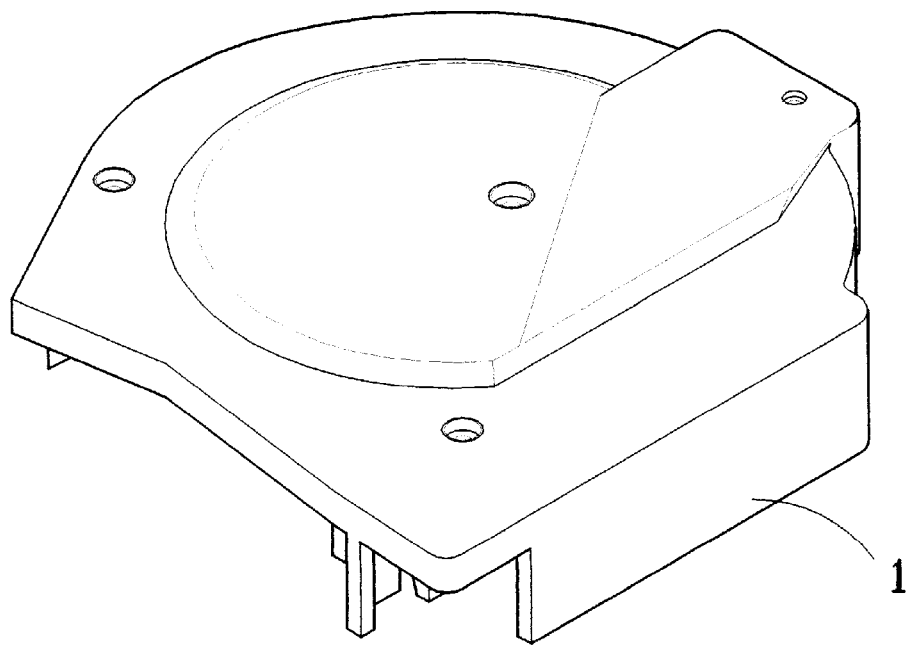
FIG. 2 is a partial exploded perspective view of the tape measure according to the first embodiment of the present invention.
Figure 2:
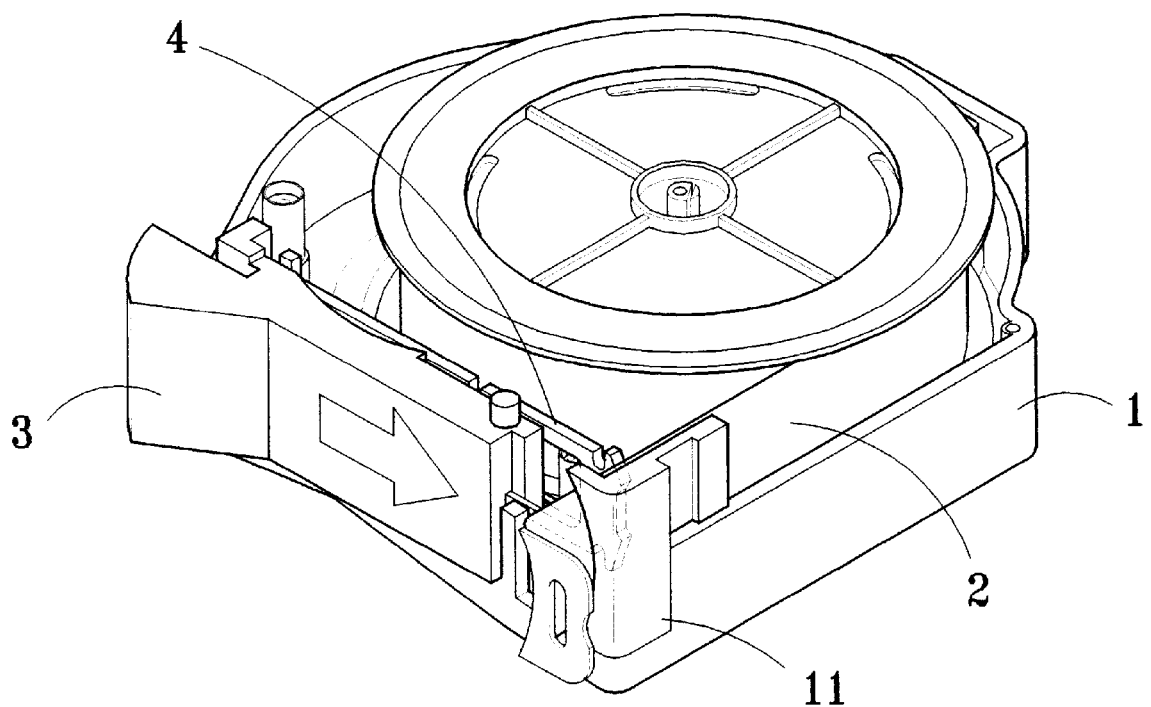
Figure 3:
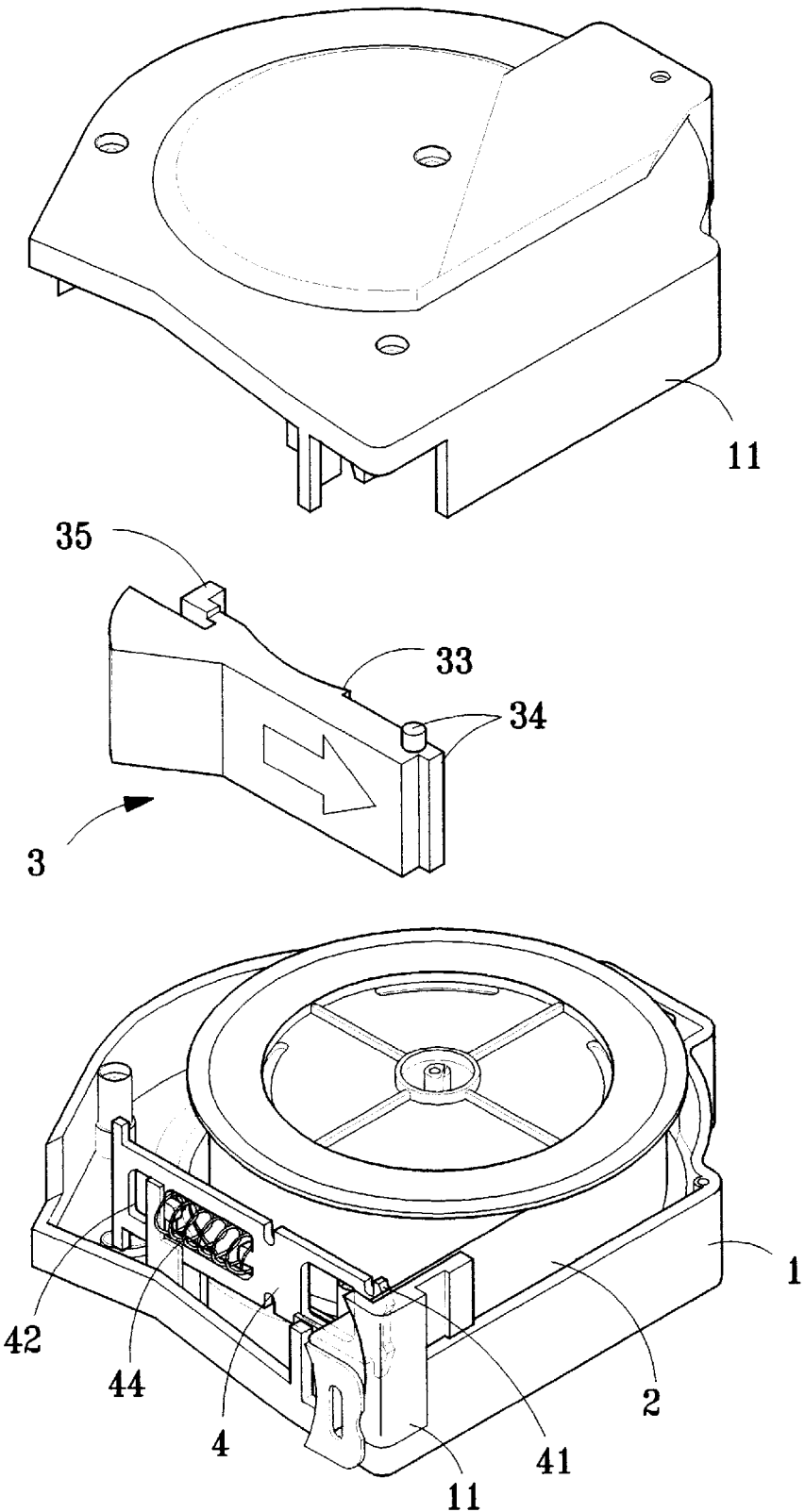
FIG. 3 is another exploded view of the tape measure according to the first embodiment of the present invention.
Figure 4:
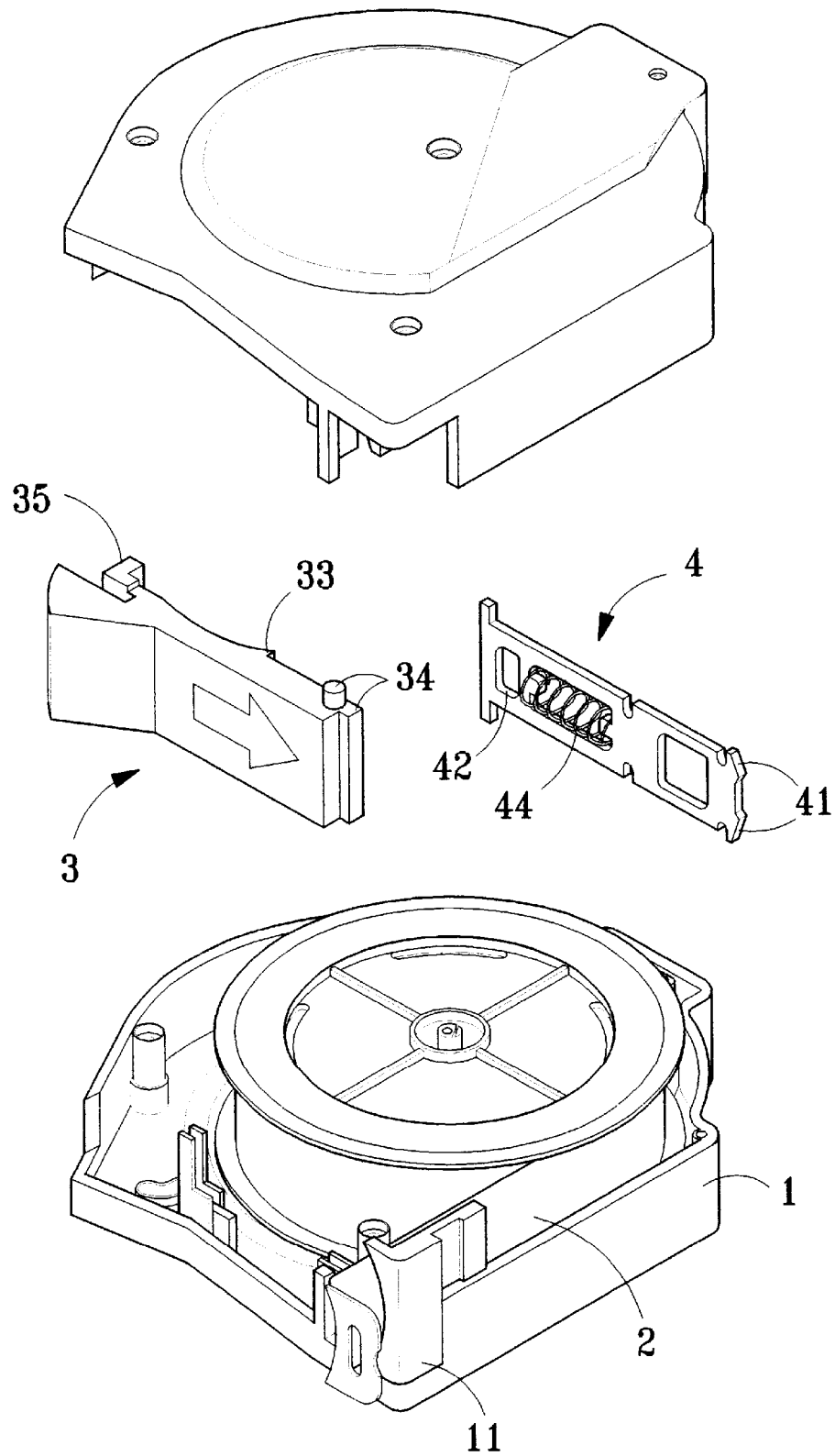
FIG. 4 is a one more exploded view of the tape measure according to the first embodiment of the present invention.

1: tape measure framework
11 :arc shaped slide strap
2: tape measure
3: release key
31: arc surface
32: flange
33: conical piece
34: front flange
4: stopper
41: flange
42: controlling slot
43: controlling plane
44: spring ring
35: rear flange

DETAILED DESCRIPTION OF THE PREFERRED EMBODIMENTS

Referring to FIGS. 1 through 4, a tape measure according to a first embodiment of the present invention illustrated, wherein the tape measure comprises: a measuring tape 2; a tape measure framework 1 for installing the measuring tape 2, and a control apparatus. An arc shaped slide strap 11 is provided on an opening of the framework 1 for engaging with a stopper 4 in the control apparatus to produce a halt function. Further to this, in addition to facilitate sliding movement of the measuring tape 2, the arc shaped slide strap 11 compresses the cross section of the measuring tape 2 into an arc figure for the convenience of the user's handling. The control apparatus, which includes a release key 3 and a stopper 4, can be operated by pressing simply with a finger to control the withdrawing motion of the measuring tape 2.

A V-shaped piece 33 is formed on an inner surface of the release key 3 for engaging with a controlling slot 42 formed at an end portion of the stopper 4. A bottom flange 34 and a top flange 35 formed at the bottom and top end of the release key 3 are all clamped onto the framework 1. When there is a force applied to the release key 3, its top flange 35 will engage with the framework 1 and be positioned there with the bottom flange 34 as a supporting point for the applied force.

There are two flanges 41 formed at the bottom tip of the stopper 4 for engaging with the arc shaped slide strap 11 on the framework 1 with the measuring tape 2 sandwiched therebetween. A spring ring 44 fastened to the framework 1 is installed at a central portion of the stopper 4 for forcing the stopper 4 to produce an outward tension which results in forcing the two flanges 41 of the stopper 4 to press the arc shaped slide strap 11 on the framework 1 with the measuring tape 2 sandwiched therebetween to perform the control function. Besides, a controlling slot 42 is formed at the end portion of the stopper 4 for accepting V-shaped piece 33 on the release key 3.

Figure 5:
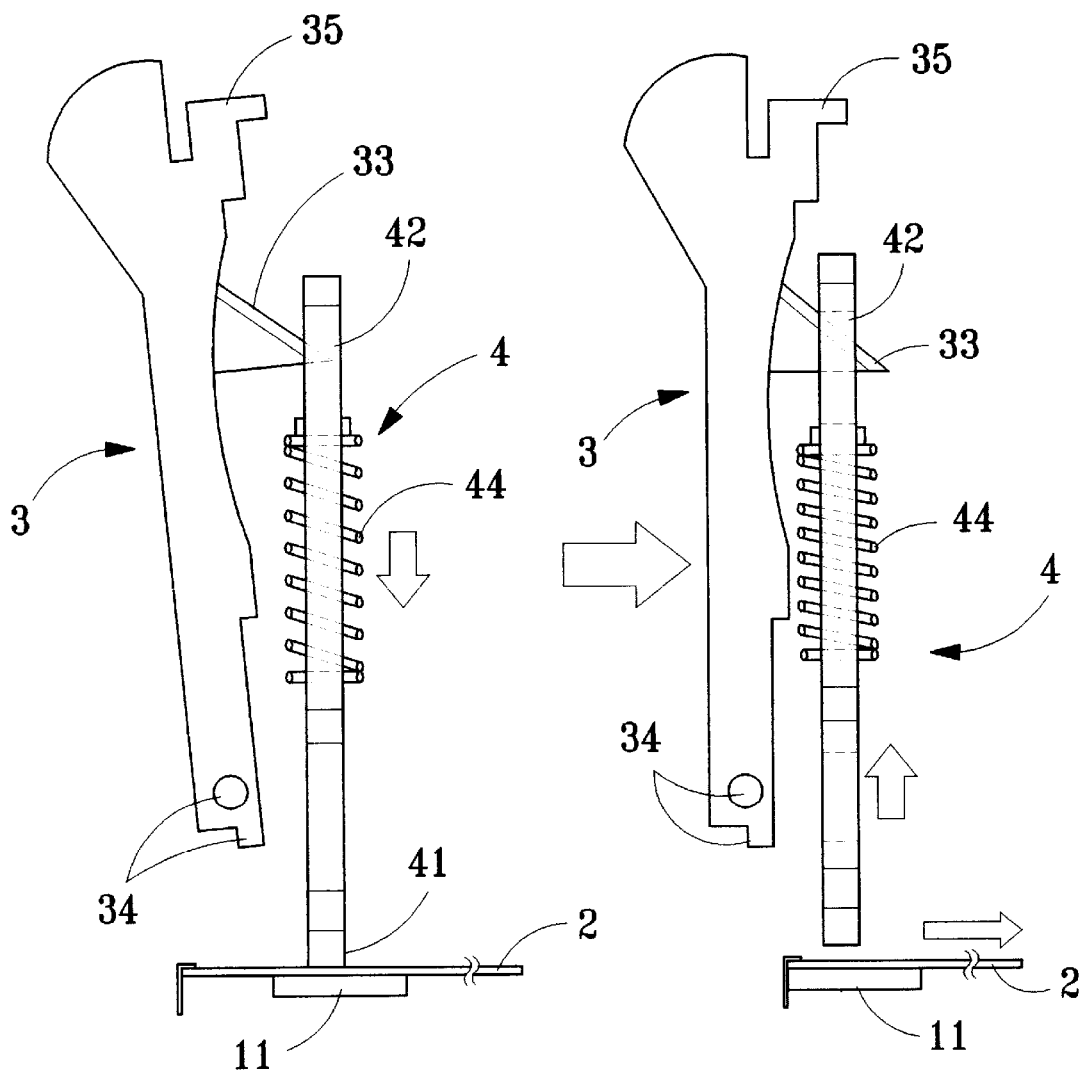
FIG. 5 is a schematic view showing the control function for the movement of the tape measure according to the first embodiment of the present invention.

When pulling out the measuring tape 2, the measuring tape does not withdraw automatically due to the holding function of the stopper 4. If the extended measuring tape 2 is to be withdrawn, the user may press the release key 3 such that the V-shaped piece 33 on the inner surface of the release key 3 moves further downward to drop into the controlling slot 42 at the end portion of the stopper 4, resulting in a backward movement of the stopper 4 and loosing its control function (see FIG. 5). At this moment the measuring tape 2 becomes free to withdraw. Then, afterwards, if the user stops pressing the release key 3, the two flanges 41 of the stopper 4, by the resiliency of the spring ring 44, will advance forward to press the arc shaped slide strap 11 on the framework 1 sandwiching the measuring tape therebetween Thereby, the control function is performed to halt the withdrawing motion of the measuring tape 2.

Figure 6:
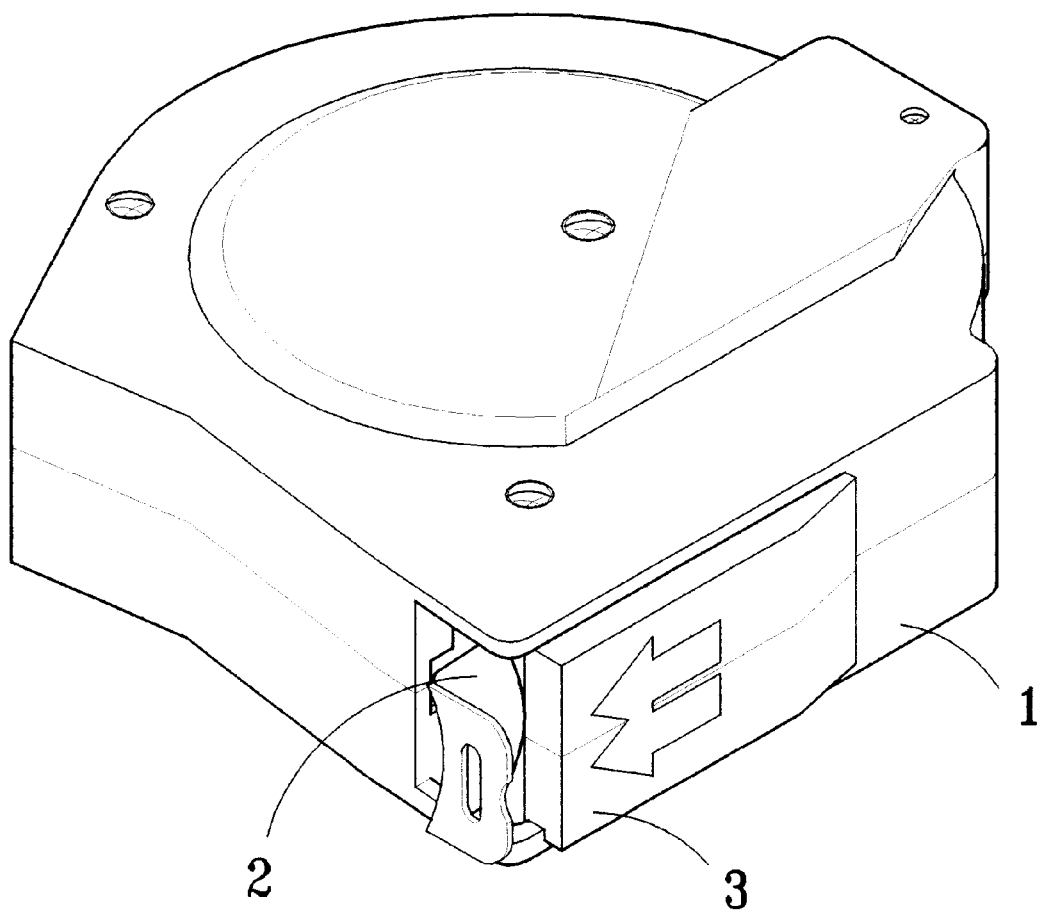
FIG. 6 is a perspective view of a tape measure according to a second embodiment of the present invention.
Figure 7:
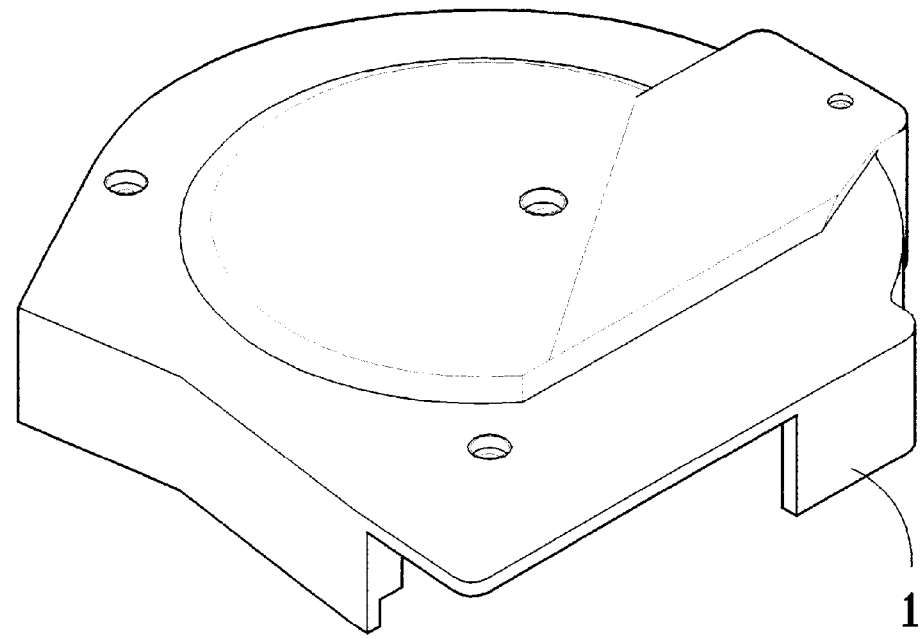
FIG. 7 is a partial exploded perspective view of the tape measure according to the second embodiment of the present invention.
Figure 7:
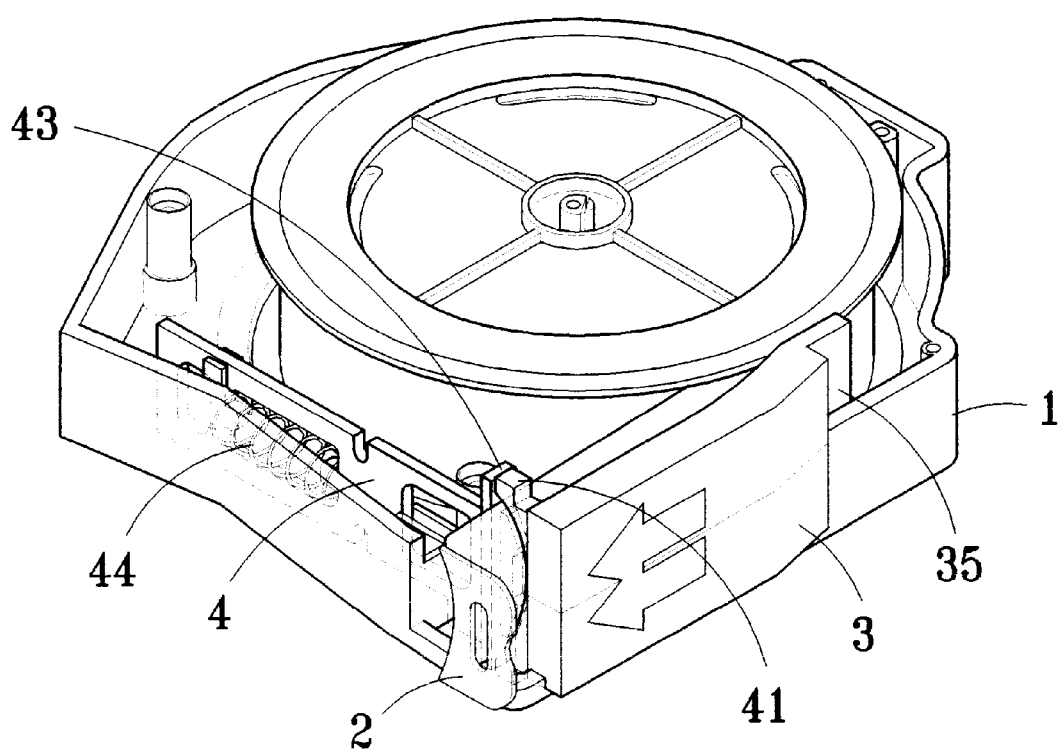
Figure 8:
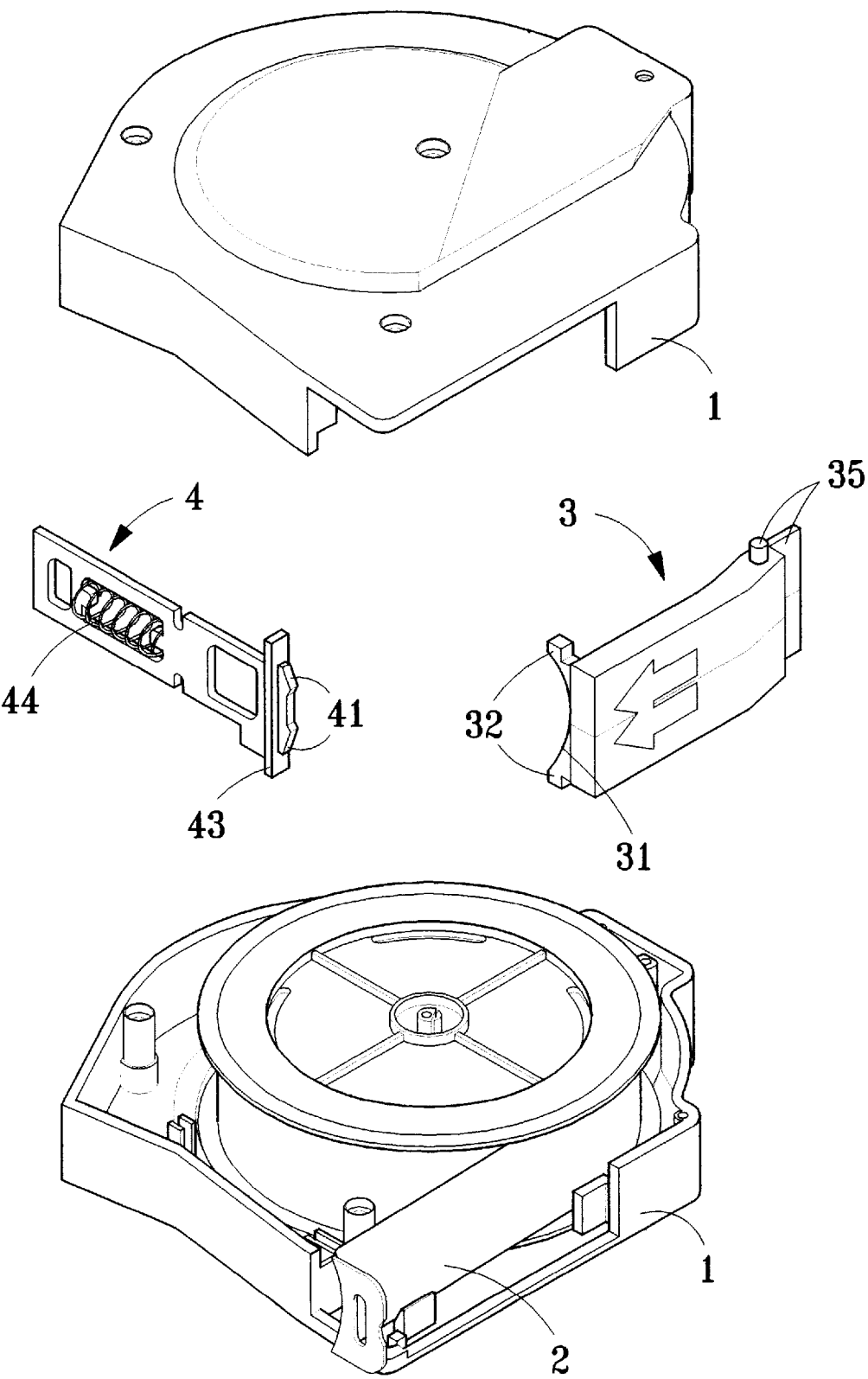
FIG. 8 is another exploded prospective view of the tape measure according to the second embodiment of the present invention.
Figure 9:
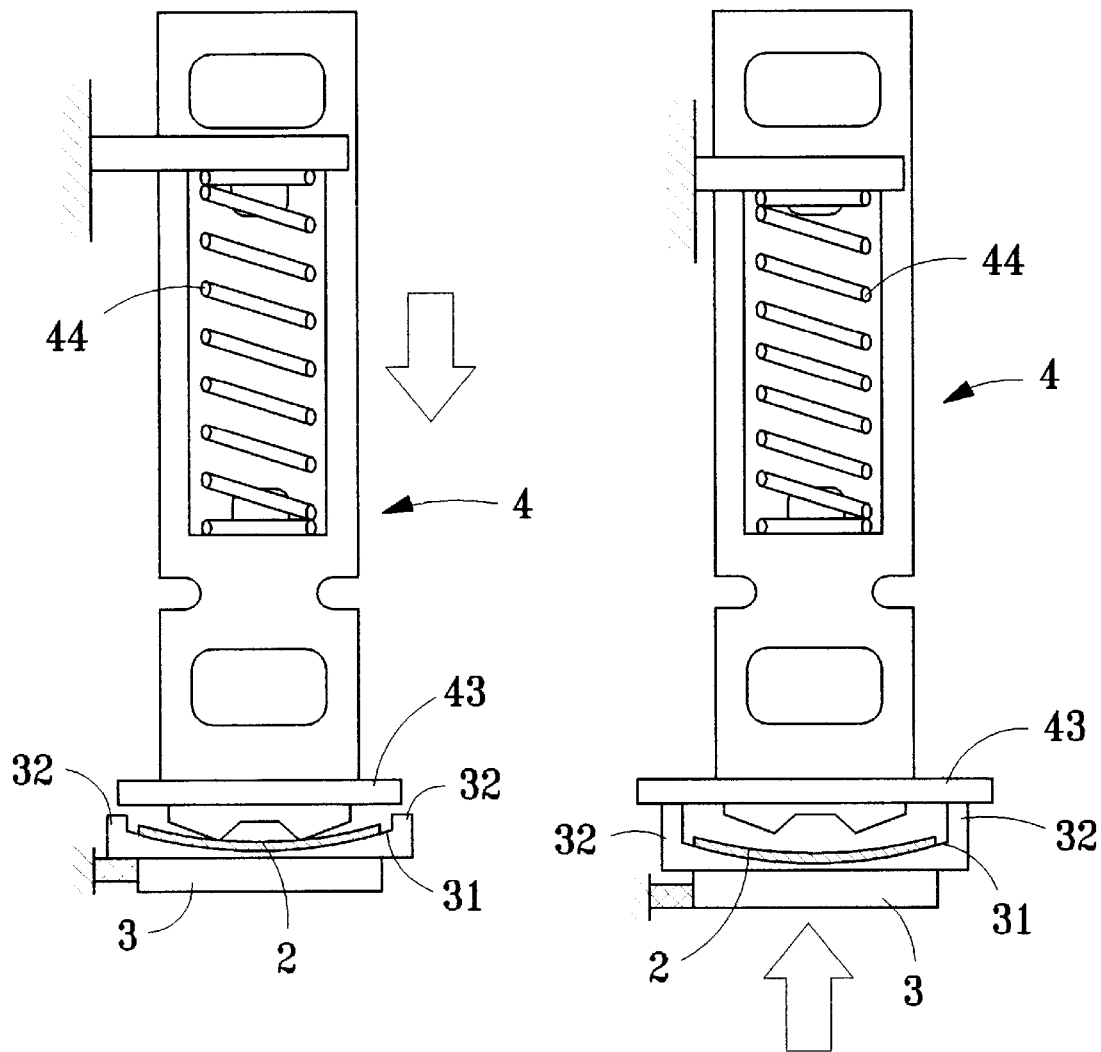
FIG. 9 is a schematic view showing the control function for the movement of the tape measure according to the second embodiment of the present invention.

Referring to FIGS. 6–8, a tape measure according to a second embodiment of the present invention is shown, wherein the tape measure comprises: a measuring tape 2; a tape measure framework 1 for installing the measuring tape 2 and a control apparatus. An arc surface 31 is formed at a lower end of a release key 3 at the opening of the framework 1, for engaging with a stopper 4 in the control apparatus to perform a halt function. Further to this, in addition to facilitate the sliding movement of the measuring tape 2, the arc surface 31 compresses the cross section of measuring tape 2 into an arc figure for the convenience of the user's handling. The control apparatus, which includes a release key 3 and a stopper 4, can be operated by pressing simply with a finger to control the withdrawal motion of the measuring tape 2.

The release key 3 included in the control apparatus has a downward bent arc surface 31 provided at its front end. There are two flanges 32 for contacting with a controlling plane 43 extended outward form the bottom of the stopper 4. A rear flange 35 of the release key 3 is engaged to the tape measure framework 1. As a force is applied to the release key 3, the rear flange 35 of the release key 3 will become the supporting point for the applied force. There are two flanges 41 formed at a bottom of the stopper 4 for contacting with an inner side of the arc surface 31 on the release key 3 with the measuring tape 2 sandwiching therebetween. A controlling plane 43 facing outward is formed on the two flanges 41 at the bottom of the stopper 4 for withstanding directly the force applied to the release key 3 such that the control function of the stopper 4 is lost. Further, a spring ring 44 fastening to the framework 1 is provided at a central portion of stopper 4 forcing the stopper to produce a downward tension. At this time, two flanges 41 on the stopper 4 press the arc surface 31 at the front end of the release key 3 along with the sandwiched measuring tape 2 therebetween to thereby perform the control function of halting the motion of measuring tape 2.

When pulling out the measuring tape 2, the measuring tape does not withdraw automatically due to the holding function of the stopper 4. If the extended measuring tape 2 is to be withdrawn, the user may press the release key 3. The two flanges 32 of the release key 3 will exert force directly on the controlling plane 43 at the bottom of the stopper 4 causing the stopper 4 to move upwardly and release control function on the measuring tape 2 permitting it to withdrawn. If the user releases the key 3, by the resiliency of the spring ring 44, the two flanges 41 of the stopper 4 will advance forward to press the arc surface 31 formed at the front end of release key 3 along with the sandwiched measuring tape 2 therebetween to thereby perform the control function of halting the withdrawal of measuring tape 2.

Many changes and modifications in the above described embodiment of the invention can, of course, be carried out without departing from the scope thereof Accordingly, to promote the progress in science and the useful art, the invention is disclosed and is intended to be limited only by the scope of the appended claims.

What is claimed is:

1. A tape measure, comprising:

a measuring tape;

a tape measure framework for installing said measuring tape and a control apparatus, wherein an arc shaped slide strap is provided on an opening of said tape measure framework for engaging with a stopper of said control apparatus to produce a halt function, moreover, in order to facilitate sliding movement of said measuring tape, said arc shaped slide strap is able to compress a cross section of said measuring tape into an arc figure;

said control apparatus including a release key adapted to be pressed to control the withdrawal motion of said measuring tape, said release key including a V-shaped piece formed on an inner surface thereof for engaging with a controlling slot formed at an end portion of the stopper, a bottom end and a top end of said release key being formed into a bottom flange and a top flange respectively, said bottom flange being clamped onto said tape measure framework, therefore when there is a force applied to said release key, the bottom flange thereof forms a supporting point for said applied force and the top flange thereof engages with said tape measure framework;

said stopper including two flanges formed at a bottom end thereof for engaging with said arc shaped slide strap on said tape measure framework with said measuring tape sandwiched therebetween, a spring ring fastened to said tape measure framework being installed at a central portion of said stopper to produce a downward tension resulting in forcing said two flanges of said stopper to press against said arc shaped slide strap on said tape measure framework with said measuring tape sandwiched therebetween to perform said halt function, said controlling slot being formed at an end portion of said stopper for accepting said V-shaped piece on said inner surface of said release key;

whereby when pulling out said measuring tape, said measuring tape does not withdraw automatically due to said stopper's halt function, wherein when said measuring tape is to be withdrawn, said release key is pressed such that said V-shaped piece on said inner surface of said release key moves into said controlling slot at said end portion of said stopper, resulting in an upward movement of said stopper and a release of the halt function thereof, at this moment said measuring tape becomes free to withdraw, then afterward when pressing of said release key is stopped, said two flanges of said stopper advance downwardly to press against said arc shaped slide strap on said tape measure framework by a resiliency of said spring ring sandwiching said measuring tape therebetween, thereby the halt function is performed to halt the withdrawal motion of said measuring tape.

2. A tape measure as recite in claim 1 wherein said stopper and said spring ring are aligned on a force exerting line.

3. A tape measure as recite in claim 1 wherein said release key exerts force directly to said stopper in order to control said withdrawal motion of said measuring tape.

* * * * *